United States Patent
Hunukumbure et al.

(10) Patent No.: US 8,879,441 B2
(45) Date of Patent: Nov. 4, 2014

(54) DYNAMIC RESOURCE ALLOCATION FOR REDUCING INTER-CELL INTERFERENCE

(75) Inventors: Mythri Hunukumbure, Hillingdon (GB); Timothy Moulsley, Caterham Surrey (GB)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 13/472,792

(22) Filed: May 16, 2012

(65) Prior Publication Data
US 2012/0307750 A1    Dec. 6, 2012

(30) Foreign Application Priority Data
May 31, 2011    (GB) .................................. 1109092.5

(51) Int. Cl.
| | |
|---|---|
| H04B 7/00 | (2006.01) |
| H04W 4/00 | (2009.01) |
| H04J 3/24 | (2006.01) |
| H04W 16/02 | (2009.01) |
| H04W 16/10 | (2009.01) |
| H04W 16/00 | (2009.01) |
| H04W 16/04 | (2009.01) |

(52) U.S. Cl.
CPC .............. *H04W 16/10* (2013.01); *H04W 16/00* (2013.01); *H04W 16/02* (2013.01); *H04W 16/04* (2013.01)
USPC ............ 370/310; 370/328; 370/338; 370/349

(58) Field of Classification Search
USPC .................................. 370/310, 328, 338, 349
See application file for complete search history.

(56) References Cited

U.S. PATENT DOCUMENTS

| | | | |
|---|---|---|---|
| 8,078,185 B2* | 12/2011 | Sun et al. ....................... 455/450 |
| 8,155,659 B2* | 4/2012 | Kazmi et al. ................ 455/452.2 |
| 8,306,549 B2* | 11/2012 | Wang et al. ................. 455/452.2 |
| 8,391,877 B2* | 3/2013 | Kazmi et al. ................... 455/447 |
| 2003/0166404 A1 | 9/2003 | Chuang et al. |
| 2006/0223540 A1 | 10/2006 | Chuang et al. |
| 2008/0248803 A1* | 10/2008 | Lee et al. ....................... 455/450 |
| 2009/0291692 A1* | 11/2009 | Kazmi et al. ................ 455/452.2 |
| 2010/0110996 A1 | 5/2010 | Tao et al. |
| 2010/0248728 A1* | 9/2010 | Sun et al. ........................ 455/450 |
| 2010/0331007 A1* | 12/2010 | Wang et al. ................. 455/452.2 |
| 2012/0225661 A1* | 9/2012 | Kazmi et al. ................... 455/447 |

FOREIGN PATENT DOCUMENTS

EP    1 152 627    11/2001

OTHER PUBLICATIONS

Great Britain Search Report dated Sep. 20, 2011, from corresponding Great Britain Application No. GB1109092.5.
N. Himayat, et al. "Interference Management for 4G Cellular Standards" IEEE Comms Magazine, vol. 48, No. 8, Aug. 2010, pp. 86-92.

(Continued)

*Primary Examiner* — Kwang B Yao
*Assistant Examiner* — Adam Duda
(74) *Attorney, Agent, or Firm* — Katten Muchin Rosenman LLP

(57) ABSTRACT

The present invention relates to a method for controlling communication resources in a cellular communication network (1), the cellular communication network comprising a plurality of cells (A to Q) which are under the control of at least one base station (10) and which use the communication resources to communicate via communication links, wherein a distance between two neighboring cells of the plurality of cells using a same communication resource is defined to be a re-use distance of said same communication resource.

16 Claims, 9 Drawing Sheets

(56) References Cited

OTHER PUBLICATIONS

"High Efficiency solid state amplifiers" EME Conference 2010, retrieved from: http://www.50mhzandup.org/High%20Efficiency%20solid%20state%20amplifiers_1.pdf.

Oliver Arnold et al. "Power Consumption Modeling of Different Base Station Types in Heterogeneous Cellular Networks" Proceedings of Future Networks Mobile Summit 2010.

Denis Tikunov, et al. "Traffic Prediction for Mobile Network using Holt-Winter's Exponential Smoothing" IEEE Softcom Conference Proceedings, 2007.

ETSI TS 136 331 V10.0.0 (Jan. 2011) Technical Specification: LTE; Evolved Universal Terrestrial Radio Access (E-UTRA); Radio Resource Control (RRC); Protocol Specification (3GPP TS 36.331 V10.0.0 Release 10), Jan. 2011.

* cited by examiner

DYNAMIC RESOURCE ALLOCATION FOR REDUCING INTER-CELL INTERFERENCE

CROSS-REFERENCE TO RELATED APPLICATIONS

The present application claims priority under 35 U.S.C. 119 from United Kingdom Application No. GB1109092.5 filed on May 31, 2011, contents of which are hereby incorporated by reference.

BACKGROUND OF THE INVENTION

1. Field of the Invention

The present invention relates to a method for controlling communication resources in a cellular communication network, wherein the cellular communication network comprises a plurality of cells under the control of at least one base station, and wherein the communication resources are frequency resources and/or time resources. The present invention further relates to a control unit implementing said method, and to a base station and a user equipment for use in said method. Particularly, but not exclusively, the present invention relates to cell resource allocation with the LTE (Long Term Evolution) and LTE-Advanced radio technology groups of standards as, for example, described in the 36-series (in particular, specification documents 36.xxx and documents related thereto), releases 9, 10 and subsequent of the 3GPP specification series. However, the present invention is also applicable to UMTS, WiMAX and other communication systems in which cell resources may be allocated.

2. Description of Related Art

A cellular communication network refers to a radio communication network comprising several geographical areas which are called "cells". The term "cell" generally refers to a radio network object as a combination of downlink and optionally uplink resources. A cell can be uniquely identified by, for example a user equipment (UE), from a (cell) identification that is broadcasted over the geographical area from an Access Point or base station. A cell may be in FDD (Frequency Division Duplex) or TDD (Time Division Duplex) mode, thus communicating with the user equipments assigned to the cell using frequency or time as communication resources. Examples of cellular communication networks are UMTS (Universal Mobile Telecommunications System), LTE, LTE-Advanced, WiMAX, also referred as "4G", and the like.

FIG. 1 illustrates an example of a cellular communication network. In FIG. 1, a plurality of cells A to Q are depicted. For the sake of simplicity, each cell is assumed to have the shape of a hexagon, thus resulting in a honeycomb cellular communication network, although the actual shape of a cell may differ. In this example, each cell is subdivided in a cell centre area depicted as a circle in the centre of the cell and a cell edge area surrounding the cell centre area. The cells are adjacent to each other in their respective cell edge areas, which is also referred to "inter-cell area".

In FIG. 1, each cell is under control of one base station. However, a base station may also control a plurality of cells. A user equipment (UE) is illustrated in the inter-cell area (marked as a dotted line in FIG. 1) of cells G and J, thus being able to communicate with the base station of cells J and/or G depending on the signal quality of the communication link with the respective base station.

The cellular communication system of FIG. 1 employs Orthogonal Frequency-Division Multiple Access (OFDMA). OFDMA is a multi-user version of the Orthogonal frequency-division multiplexing (OFDM) digital modulation scheme. Multiple access is achieved in OFDMA by assigning subsets of subcarriers (also referred as "communication resources") to individual user equipments. By assigning distinct frequency/time communication resources to each user equipment in a cell, OFDMA can substantially avoid interference among the users served within a given cell. In many cellular communication systems, including those based on OFDMA, the same set of frequency domain resources can be allocated to every cell.

In order to reduce inter-cell interference, a fractional frequency re-use (FFR) has been proposed. FFR schemes divide the frequency spectrum into sub-sets, a cell centre set and a cell edge set of communication resources. According to FFR, the cell centre set is identical for all cells, and the cell edge set is different for adjacent cells. Thus, inter-cell interference for UEs in the edge area can be reduced, as these UEs communicate on different communication resources. However, since FFR does not use the whole available frequency bandwidth in each cell, in the absence of significant adjacent channel interference (e.g. due to low load in adjacent cells), overall cell throughput in a cell employing FFR is lower than in a cell with a re-use factor one, i.e. a cell serving the UE with the whole available frequency bandwidth.

A soft FFR scheme has been proposed to increase the overall cell throughput of cells employing the FFR scheme. Soft FFR assigns communication resources of the cell edge sets in cell centre sets, but with low transmit power. Thus, more communication resources may be employed in soft FFR while maintaining a re-use distance for the same communication resources by appropriately selecting the cell centre sets and the transmit powers.

FIG. 1 illustrates how a soft FFR scheme may be applied to a cellular communication network using six frequency resources designated as $f_1$ to $f_6$. A frequency re-use 3 pattern is applied at the cell edges, with two frequency bands employed for each cell edge. The cell centre areas occupy the other 4/6 of the frequency bands, (frequency resources). Assuming uniform user distribution in a cell, the cell centre areas span 2/3 of the whole cell area or 82% of the cell radius. The power allocation for the cell centre areas may be approximately 3 dB down from the cell edge power allocation, assuming a path loss exponent of 3.5. A vertical antenna pattern with 6° half power beamwidth may be employed.

FIG. 2 illustrates the signal to interference ratio (SIR) as seen by the user equipment at the inter-cell area of the cellular communication network of FIG. 1. The SIR is calculated for random user equipment locations in the inter-cell area and the shadow fading component is varied, according to a log-Normal distribution with 8 dB standard deviation. The user equipment uses the communication link as per, for example, the best measured RSRQ (Reference Signal Received Quality) value as defined in LTE standard document TS 36.331, V10.0.0, section 5.5, which is hereby incorporated in its entirety by reference. The number of occupied sub-carriers of the frequency resources is varied according to the load of each cell and the number of collisions with the cell edge user equipment is calculated. Each iteration sees a random allocation of sub-carrier indices for the cell edge userequipment and neighbour cells, depending on their load. The simulated SIR for the 10,000 iterations is plotted in FIG. 2.

BRIEF SUMMARY OF THE INVENTION

It is desirable to reduce inter-cell interference and thus to improve a signal to interferenace ratio for a user equipment in the inter-cell area.

According to an aspect of the invention, a method for controlling communication resources in a cellular communication network, the cellular communication network comprising a plurality of cells which are under the control of at least one base station and which use the communication resources to communicate via communication links, wherein a distance between two neighbouring cells of the plurality of cells using a same communication resource is defined to be a re-use distance of said same communication resource, comprises:

configuring a first setup of communication resources for a first cell of said plurality of cells, and controlling the first cell to use a first set of communication resources indicated in the first setup by:

controlling the first cell to use a high load set of communication resources of the first set if a first load represented by a high load value is present at the first cell, and controlling the first cell to use a low load set of communication resources of the first set if a second load represented by a low load value is present at the first cell, wherein the first load is higher than the second load, and wherein the re-use distance of at least one communication resource of the low load set is larger than the re-use distance of the at least one communication resource of the high load set.

The inventors of the present invention found that the SIR in the inter-cell area can be improved by varying re-use distances of communication resources in dependence on traffic load values by, for example, assigning less communication resources to a cell whose traffic load value has decreased over time, assigning less communication resources to the cell centre of a cell which has a lower traffic load value compared to communication resources of other cells having higher traffic load values etc. The communication resources are preferably frequency, time, code, and/or spatial resources, wherein the spatial resource may, for example, be defined in terms of the direction of a transmitted beam. The proposed resource allocation algorithm achieves interference power reductions over, for example, the known static resource allocation algorithm of soft FFR as well as of non-FFR. Further, for Green wireless applications, the interference reduction of the proposed resource allocation algorithm allows the base station, for example the eNodeB (eNB), to operate at lower transmit power for the communication resources at the cell centre and for resources at cell edge, due to reduced interference, thus achieving energy saving.

Although a preferred embodiment relates to a centralised, dynamic resource allocation algorithm the present invention also encompasses embodiments with a pre-defined static resource allocation setup ("setup" may also referred to as "pattern" or "configuration") at every base station, where the usage of the communication resources is separated as required by the load conditions, thus providing a cell centre of a cell with lower load with less communication resources than other cells with higher loads. In another embodiment, the invention relates to a hybrid static/dynamic allocation algorithm for adapting pre-defined patterns in situations such as if an unplanned event (like an emergency) occurs in a particular cell or area of cells, thus providing flexibility to override a current allocation pattern and devise a new pattern for generating additional capacity in the required area.

Currently, a static soft-FFR allocation pattern has been proposed for 4G networks. In the known static soft-FFR deployment, the cell edge areas are allocated a frequency re-use 3 pattern as explained above, while the cell centre areas are allocated the remaining frequency bands, albeit with reduced transmit power. The sub-carrier resources are randomized such that at low load the collision probability is lower, thus reducing interference. However, the inventors found that by, preferably dynamically, allocating the frequency (and/or time) resources for a cell dependant on the load conditions, significant reductions in interference over the known static scheme can be achieved.

In an OFDMA system like, for example, LTE, with the use of time/frequency domain scheduling techniques, lower downlink traffic loading in a cell results in lower occupancy of time/frequency domain transmission resources and a consequent reduction in average collisions of these resources with other active cells. This is the basis of using the known static soft-FFR resource allocation. The known soft FFR allows all the cells to access all the resources all the time, thus maximizing the offered network capacity.

However, the inventors recognised that, when cells are at lower load conditions, the cells do not need the maximum offered capacity, and that, if the concurrent use of the same time/frequency resources is configured to separated larger re-use distances by restricting the offered resources in the cell(s), significant improvements in SIR (Signal to Interference Ratio) can be achieved in the cell edge area. The proposed dynamic resource allocation algorithm is thus particularly advantageous when variable load conditions are prevalent in a network by increasing the resource reuse distances for the cells with lower loads.

The high load value and low load value may be, for example, pre-determined or adjusted dynamically. Also, the distinction between high and low loads may be determined by comparison with a threshold load value. Preferably, the step of controlling the first cell to use the first set of communication resources indicated in the first setup includes controlling the first cell to use the high load set of communication resources as the first set if the first load represented by the high load value is present at the first cell, and controlling the first cell to use the low load set of communication resources as the first set if the second load represented by the low load value is present at the first cell.

The inventors found that embodiments of the invention may be particularly advantageous when implemented in FFR algorithm, but other embodiments of the invention relate to non-FFR algorithm. Also, some embodiments may refer to cellular networks in which all cells (or a plurality of cells) have, or are considered to have, the same traffic load which changes over time, whereas other embodiments relate to cellular networks in which cells have different traffic load values which may or may not change over time.

A "target distance" (which may be a pre-defined re-use distance) to re-use the same communication resource may be applicable in homogeneous networks, where the same cell type is deployed. However, for heterogeneous networks, where a mixture of, for example, macro, micro and pico (and possibly femto) cells are deployed, the "target distance" may not be exactly a distance measure, but may refer to the number of cells crossed to reach the same resource used or allocated in another cell. By "re-use distance" it may be referred to the minimum number of cells which lie between a cell assigned a given communication resource and another cell assigned the same communication resource. Where a regular frequency re-use pattern is applied, the re-use distance may be directly related to the number of cells with different resources within one repeating element of the re-use pattern.

A preferred embodiment of a centralized configuration of the algorithm allows it to be implemented in centralised control unit, such as a Self Organizing Networks (SON) server, but in another preferred embodiment a distributed configuration of distributed control units may be implemented, for example, in the base stations. The centralized configuration provides the advantage of avoiding signaling between base stations, such as X2 signalling in LTE, which might be required in distributed resource allocation algorithms.

Thus, the invention relates to a centralized and/or distributed algorithm for, preferably dynamically, allocating communication resources to base stations (eNodeBs), wherein larger re-use distances of communication resources are allocated to a cell with low load than compared to a cell with high load. The resource allocation depends on the load supported by a base station controlling a cell.

The proposed algorithm preferably allocates at least some orthogonal resources to adjacent cells for reducing inter-cell interference. The algorithm may be implemented, for example, at a higher layer to the eNodeB network like on a SON server or on a RNC (Radio Network Controller) of a lower layer. The proposed algorithm may be applied to all, some or only one of the cells of the cellular communication network.

In a preferred embodiment, the method further comprises:
configuring a second setup of communication resources for a second cell of said plurality of cells in dependence upon the re-use distance of the at least one communication resource of the low load set and/or the re-use distance of the at least one communication resource of the high load set, the second setup indicating a second set of communication resources to be used by the second cell, wherein a re-use distance of at least one communication resource of the second set is larger than a re-use distance of at least one communication resource of the first set.

Accordingly, it is preferred that the second cell has lower traffic load than the first cell. However, in another embodiment the second cell may have the same traffic load as the first cell.

The setup for a cell (such as the first cell) with maximum load may used as a basic or default setup for the cellular network for configuring other setups of cells (such as the second ell) with less load. Preferably, the other setups are configured by maximising (or increasing) the re-use distances for the respective communication resources of the basic or default setup. However, the present invention also encompasses embodiments in which the second setup is configured independent from the first setup. That is, it may be preferred that the communication resources of the second cell (or any other cell of the plurality of cells) are controlled as above explained with respect to the first cell.

In a preferred embodiment, wherein the first cell has a first load value representing the loads on the communication links associated with the first cell, the method further comprises:
configuring a second setup of communication resources for a second cell of said plurality of cells, the second cell having a second load value representing the loads on the communication links associated with the second cell, wherein the first load value is higher than the second load value, and
controlling the second cell to use a second set of communication resources indicated in the second setup, wherein the second set comprises less communication resources than the first set.

Preferably, the second cell is a neighbouring cell to the first cell. Preferably, at least some of the communication resources of the first and second setup overlap, that is are the same. Preferably, the second cell has lower load than the first cell. Preferably, the first cell has the highest load value of the cells of the cellular network and the second cell has the second-highest load value of the cells of the cellular network. Preferably, the allocations are updated at regular intervals when the load conditions change.

In a preferred embodiment, the first set comprises first cell centre communication resources for a first cell centre area of the first cell and first cell edge communication resources for a first cell edge area of the first cell, wherein the first cell edge communication resources differ from the first cell centre communication resources, and the second set comprises second cell centre communication resources for a second cell centre area of the second cell and second cell edge communication resources for a second cell edge area of the second cell, wherein the second cell edge communication resources differ from the second cell centre communication resources, wherein the second cell centre communication resources are less than the first cell centre communication resources.

Preferably, there are fewer second cell centre communication resources than first cell centre communication resources. Preferably, there are fewer second cell centre communication resources than first cell centre communication resources. Preferably, the second cell centre area is smaller than the first cell centre area. Further, it is preferred that the transmit power of the second cell centre communication resources is smaller than the transmit power of the first cell centre communication resources.

In a preferred embodiment, the step of configuring the first and/or second setup includes
assigning priority information to the communication resources comprised in the first and/or second setup, and the step of controlling the first and/or second cell includes
controlling the first and/or second cell to use the first and/or second set of communication resources on the basis of the priority information.

Preferably, first setup information representing the first setup comprises priority information for using the communication resources of the first set and second setup information representing the second setup comprises priority information for using the communication resources of the second set.

The term "setup of communication resources" may be understood as to referring to the general configuration of all communication resources for a cell, whereas the term "set of communication resources" may be understood as to referring to the communication resources actually employed on the communication links of the cell. Thus, the "setup" may refer to active and inactive communication resources and the "set" may refer to the active communication resources only. The priority information may be used at the side of a base station controlling the cell to determine which of the communication resources the configuration thereof being indicated in the setup to be actually used in the set of active communication resources. Thus, the actual determination (also referred to as "selection" or "separation") which communication resources to use may be done on the side of the base station depending on the current load value: if a current load value of the cell is low, the base station may control the cell to use the communication resources with high priority only, whereas if the current load value is high, the base station may control the cell to use the communication resources with high and low priority. In a preferred embodiment of a centralised resource allocation algorithm, the communication resources of the first and/or second setup are identical to the communication resources of the first and/or second set. In a preferred embodiment of a distributed resource allocation algorithm, the communication resources of the first and/or second setup differ from to the communication resources of the first and/or second set, i.e. there are more communication resources indicated in the first and/or second setup than indicated in the first and/or second set. Preferably, the remaining communication resources which are indicated in the first and/or second setup, but are not indicated in the first and/or second set, are optional communication resources and/or communication resources with low priority.

Thus, in an embodiment of a distributed dynamic (or hybrid of static/dynamic) resource allocation scheme, the communication resources for each cell may be pre-defined in the setups, which are then preferably default setups, but each communication resources may have an assigned priority, and the communication resources are allocated in order of priority to the level required to satisfy the current traffic load in that cell on the side of the base station. The priority order for each cell may be determined for increasing or maximising the re-use distance at any given load for the network.

In a preferred embodiment, the method further comprises:
  determining load values representing loads on communication links associated with the plurality of cells, wherein the load values comprise the high and low load values or the high, low, first and second load values, and/or
  predicting load values representing loads on communication links associated with the plurality of cells, wherein the load values comprise the high and low load values or the high, low, first and second load values,
  wherein the method further comprises:
  adapting the first and second sets and/or the first and second setups on the basis of the determined and/or predicted load values.

Preferably, the high and low load values are pre-determined load values and the first and second load values are determined, preferably measured, load values.

The steps of determining and/or predicating are preferably carried out in the base stations. Thus, each base station may determine and/or predict the load values of the cells associated with it and may transmit load value information representing the load values to a control unit of a central server for configuring the setups on the basis of the load values.

Also, it may be preferred that the steps of determining and/or predicating are preferably carried out in a central control unit. Accordingly, the method preferably further comprises the steps: receiving load value information representing loads on communication links associated with the plurality of cells from the at least one base station, wherein the load values comprise the first and second load values, and wherein the step of determining and/or predicting the load values includes: determining and/or predicting the load values on the basis of the load value information.

Further it is preferred that the method may further comprise: configuring the first and second setups on the basis of the determined and/or predicted load values. Preferably, the method also comprises a step of transmitting first and/or second setup information representing the first and/or second setup to the at least one base station controlling the first and/or second cell.

It may also be preferred that the load values are default load values which are for example pre-defined upon start-up of the cellular communication network or its entities.

In a preferred embodiment, the method further comprises:
  updating the first and/or second cell with an updated first and/or second setup for enabling and/or disabling communication resources of the first and/or second set.

Preferably, enabling and/or disabling communication resources includes enabling and/or disabling at least one communication resource of the first and/or second cell centre communication resources. Preferably, enabling and/or disabling communication resources includes enabling and/or disabling at least one communication resource of the first and/or second set on the basis of the determined and/or predicted load values and/or of the received load value information. In an embodiment, the updating process is regularly repeated. In another embodiment, the updating process may be carried out upon particular occasions, such as for example, upon determining that the first and/or second load value exceeds a threshold value.

In a preferred embodiment, the second setup indicates at least one optional and/or prohibited communication resource, and the method further comprises:
  controlling the second cell to not use the at least one prohibited communication resource, and/or
  controlling the second cell to use the at least one optional communication resource if the second load value exceeds a threshold load value.

Preferably, the first setup indicates the first set of communication resources and wherein the second setup indicates the second set of communication resources and at least one optional and/or prohibited communication resource which is comprised in the first setup. Thus, if the second load value increases and more communication resources for the second cell are required, the second cell may not only use the communication resources of the second set, but also one or more optional communication resources. The optional communication resources may be indicated by priority information. The optional communication resources may be optional communication resources for the second cell centre, i.e. may be optional second cell centre communication resources. However, the second cell may not use the prohibited communication resources which may be communication resources of the first set. Preferably, the at least one optional and/or prohibited communication resource is comprised in the first set of communication resources. Further, it is preferred that the threshold load value is a predetermined load value and/or the predicted second load value.

In another preferred embodiment, the step of configuring the second setup includes:
  selecting the communication resources of the second setup and/or the second set on the basis of the second load value and of the first setup and/or the first set.

In still another preferred embodiment, the step of configuring the second setup includes:
  selecting the second cell centre communication resources by:
  pre-selecting the first cell edge communication resources, and
  de-selecting at least one of the pre-selected communication resources.

Preferably, wherein the step of configuring the second setup includes: selecting the second cell centre communication resources by: pre-selecting the first cell edge communication resources and third cell edge communication resources of a third cell of said plurality of cells, and de-selecting at least one of the pre-selected communication resources. Preferably, the step of selecting the second cell centre communication resources is based on the re-use distances of the communication resources of the first setup and/or first set.

In another preferred embodiment, the method further comprises:
  determining re-use distances of the pre-selected communication resources, and
  wherein the step of de-selecting the at least one of the pre-selected communication resources is based on the determined re-use distances of the pre-selected communication resources.

Preferably, the step of de-selecting the at least one of the pre-selected communication resources is based on target re-use distances for the pre-selected communication resources. Also, it is preferred that the step of de-selecting the at least one of the pre-selected communication resources is based on increasing re-use distances for the pre-selected communication resources. Further preferably, the method further comprises: determining a signal to interference ratio at an inter-cell area of the first and second cell edge areas, wherein the step of de-selecting the at least one of the pre-selected communication resources is based on the signal to interference ratio.

In a preferred embodiment, the method further comprises:
configuring a third setup of communication resources for a third cell of said plurality of cells, the third cell having a third load value representing loads on communication links associated with the third cell, wherein the second load value is higher than the third load value,
controlling the third cell to use a third set of communication resources indicated in the third setup,
wherein the third set comprises third cell centre communication resources for a third cell centre area of the third cell and third cell edge communication resources for a third cell edge area of the third cell, wherein the third cell edge communication resources differ from the third cell centre communication resources, and wherein the third cell centre communication resources are less than the second cell centre communication resources, or
wherein the third set comprises third cell communication resources for a third cell area of the third cell, and wherein the third cell communication resources are less than the second cell centre communication resources.

Thus, the proposed resource allocation algorithm may be applied to any number of cells of a cellular network. Hence, the present invention encompasses also scenarios with more than a two cells having different load values as well as scenarios with a plurality of cells having different load values, wherein at least two cells of the plurality may have the same load value. Further, embodiments of the present invention also encompass scenarios in which the load values for different cells change with time, leading to resource allocation (preferably, in the setup) and resource use (preferably, in the set) which change with time.

In an embodiment, the third cell area is the whole area of the third cell if the third cell is the cell with the lowest load value. The third cell edge communication resources may be the same as the third cell centre communication resources. The third setup may indicate the third cell communication resources to be used in the third cell as a whole. Thus, the third cell area is preferably not subdivided in a third cell centre area and a third cell edge area. However, in an alternative embodiment the third cell area is subdivided in a third cell centre area and a third cell edge area.

Similar embodiments as set out with respect to the first cell and the second cell may be provided for the second cell and the third cell (or any other number of cells). For example, the method preferably further comprises: determining second re-use distances of the communication resources of the second set, and the step of configuring the third setup comprises: configuring the third setup on the basis of the first and/or second re-use distances. Also, it may be preferred that the step of configuring the third setup comprises: selecting the communication resources of the third setup and/or the third set on the basis of the third load value and of the first and/or second setup and/or the first and/or second set.

In another aspect, the invention relates to a control unit for controlling communication resources in a cellular communication network, the cellular communication network comprising a plurality of cells which are under the control of at least one base station and which use the communication resources to communicate via communication links, wherein a distance between two neighbouring cells of the plurality of cells using a same communication resource is defined to be a re-use distance of said same communication resource, the control unit comprising:
a setup configuring unit for configuring a first setup of communication resources for a first cell of said plurality of cells, and
a communication resource controlling unit for controlling the first cell to use a first set of communication resources indicated in the first setup, by:
controlling the first cell to use a high load set of communication resources of the first set if a first load represented by a high load value is present at the first cell, and
controlling the first cell to use a low load set of communication resources of the first set if a second load represented by a low load value is present at the first cell,
wherein the first load is higher than the second load, and
wherein the re-use distance of at least one communication resource of the low load set is larger than the re-use distance of the at least one communication resource of the high load set.

Preferably, the control unit is comprised in a network control unit of the cellular communication network and/or is comprised in the at least one base station.

In another aspect, the invention relates to a method (preferably carried out by a base station) for controlling a first cell of a cellular communication network, the cellular communication network comprising a plurality of cells which are under control of at least one base station and which use communication resources to communicate via communication links, wherein a distance between two neighbouring cells of the plurality of cells using a same communication resource is defined to be a re-use distance of said same communication resource, the method comprising:
receiving first setup information representing a first setup of communication resources for the first cell, and
controlling the first cell to use a first set of communication resources indicated in the first setup by:
controlling the first cell to use a high load set of communication resources of the first set if a first load represented by a high load value is present at the first cell, and
controlling the first cell to use a low load set of communication resources of the first set if a second load represented by a low load value is present at the first cell,
wherein the first load is higher than the second load, and
wherein the re-use distance of at least one communication resource of the low load set is larger than the re-use distance of the at least one communication resource of the high load set.

In another aspect, the invention relates to a base station for controlling a first cell of a cellular communication network, the cellular communication network comprising a plurality of cells which are under control of at least one base station and which use communication resources to communicate via communication links, wherein a distance between two neighbouring cells of the plurality of cells using a same communication resource is defined to be a re-use distance of said same communication resource, wherein the base station comprises:

a setup receiving unit for receiving first setup information representing a first setup of communication resources for the first cell, and a communication resource controlling unit for controlling the first cell to use a first set of communication resources indicated in the first setup by:

controlling the first cell to use a high load set of communication resources of the first set if a first load represented by a high load value is present at the first cell, and controlling the first cell to use a low load set of communication resources of the first set if a second load represented by a low load value is present at the first cell, wherein the first load is higher than the second load, and wherein the re-use distance of at least one communication resource of the low load set is larger than the re-use distance of the at least one communication resource of the high load set.

In another aspect, the invention relates to a method (preferably carried out by a user equipment) for controlling a user equipment communicating with a first cell of a cellular communication network, the cellular communication network comprising a plurality of cells which are under the control of at least one base station and which use communication resources to communicate via communication links, wherein a distance between two neighbouring cells of the plurality of cells using a same communication resource is defined to be a re-use distance of said same communication resource, the method comprising:

receiving first setup information representing a first setup of communication resources for the first cell, and controlling the user equipment to communicate with the first cell by using a first set of communication resources indicated in the first setup, wherein the first cell is controlled to use a high load set of communication resources of the first set if a first load represented by a high load value is present at the first cell, and wherein the first cell is controlled to use a low load set of communication resources of the first set if a second load represented by a low load value is present at the first cell, wherein the first load is higher than the second load, and wherein the re-use distance of at least one communication resource of the low load set is larger than the re-use distance of the at least one communication resource of the high load set.

In another aspect, the invention relates to a user equipment for communicating with a first cell of a cellular communication network, the cellular communication network comprising a plurality of cells which are under the control of at least one base station and which use the communication resources to communicate via communication links, wherein a distance between two neighbouring cells of the plurality of cells using a same communication resource is defined to be a re-use distance of said same communication resource, the user equipment comprising:

a setup receiving unit for receiving first setup information representing a first setup of communication resources for the first cell, and a communication controlling unit for controlling the user equipment to communicate with the first cell by using a first set of communication resources indicated in the first setup, wherein the first cell is controlled to use a high load set of communication resources of the first set if a first load represented by a high load value is present at the first cell, and wherein the first cell is controlled to use a low load set of communication resources of the first set if a second load represented by a low load value is present at the first cell, wherein the first load is higher than the second load, and wherein the re-use distance of at least one communication resource of the low load set is larger than the re-use distance of the at least one communication resource of the high load set.

In another aspect, the invention relates to a computer readable medium storing program code for, when executed, causing a computer to perform any of the methods of the claims. In still another aspect, the invention relates to a computer-implemented method for, when executed, causing a computer to perform any of the methods of the claims. Preferably, the method steps as defined in the claims may be carried out by software and/or hardware. Also, it is preferred that the units as defined in the claims may be implemented in software and/or hardware.

In another aspect, the invention relates to a method for controlling communication resources in a cellular communication network, the cellular communication network comprising a plurality of cells under the control of at least one base station, wherein the communication resources are frequency resources and/or time resources, the method comprising:

configuring a first setup of communication resources for a first cell of said plurality of cells, the first cell having a first load value representing loads on communication links associated with the first cell, configuring a second setup of communication resources for a second cell of said plurality of cells, the second cell having a second load value representing loads on communication links associated with the second cell, wherein the first load value is higher than the second load value, controlling the first cell to use a first set of communication resources indicated in the first setup, wherein the first set comprises first cell centre communication resources for a first cell centre area of the first cell and first cell edge communication resources for a first cell edge area of the first cell, wherein the first cell edge communication resources differ from the first cell centre communication resources, and controlling the second cell to use a second set of communication resources indicated in the second setup, wherein the second set comprises second cell centre communication resources for a second cell centre area (12G) of the second cell and second cell edge communication resources for a second cell edge area (11G) of the second cell, wherein the second cell edge communication resources differ from the second cell centre communication resources, wherein the second cell centre communication resources are less than the first cell centre communication resources.

In preferred embodiment, the second cell centre communication resources are different from the first cell centre communication resources. In another preferred embodiment, the cell edge resources of the first and/or of the second cell are zero, that is there is no distinction between the cell centre and cell edge communication resources.

In other preferred aspects, there is a control unit for controlling communication resources in the cellular communication network by the above described method, a method (preferably carried out at a base station) for controlling the first cell and the second cell of the cellular communication network in accordance with aspects of the above described method, a method (preferably carried out at a user equipment) for controlling a user equipment communicating with the first cell and the second cell of the cellular communication network in accordance with aspects of the above described method, and program code (preferably stored on a computer readable medium) for, when executed, causing a computer to perform aspects of the above described method.

Preferred embodiments of the present application will now be described, by way of example, with reference to the accompanying drawings in which,

DETAILED DESCRIPTION OF THE INVENTION

Figure 3:
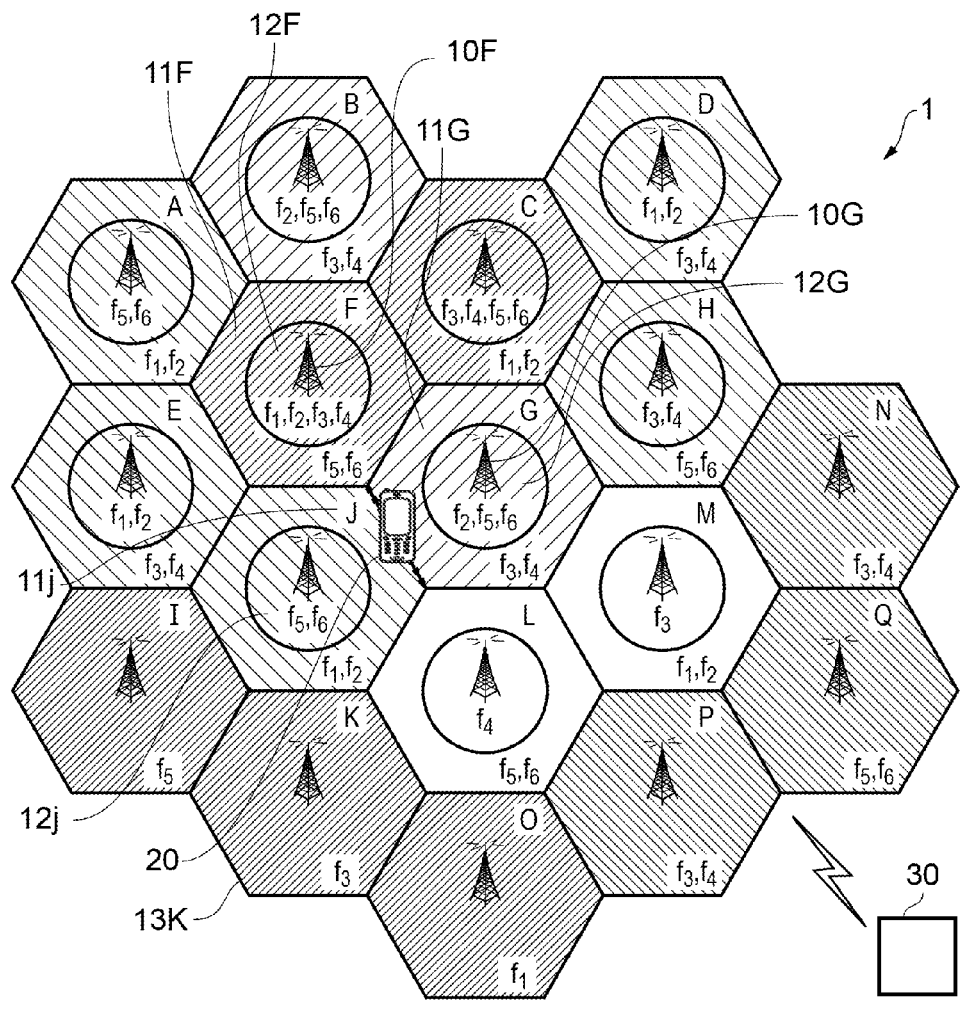
FIG. 3 illustrates an embodiment of the resource allocation in a cellular communication network according to the present invention.

FIG. 3 illustrates an embodiment of the performance of the resource allocation algorithm of the invention in a cellular communication network 1 with varied load conditions. The network 1 comprises cells A to Q. Six load levels are illustrated in the network at a given time period. For example, cell F is a cell with the highest load level represented by a highest load value. Cell F is referred to as the "first cell" in the following. Cell G is a cell with the second-highest load level represented by a second-highest load value. Cell 0 is referred to as the "second cell" in the following. Cell J is a cell with the third-highest load level represented by a third-highest load value. Cell J is referred to as the "third cell" in the following. For the sake of simplicity, explanations with respect to cells with the fourth-highest and fifth-highest load values is omitted in the following, but similar principles as applied to the first, second and third cells may be applied to these as well. Cell K is a cell with the sixth-highest (which is, in the embodiment illustrated in FIG. 3, the lowest) load level represented by a lowest load value. Cell K is referred to as the "fourth cell" in the following explanations with respect to the embodiment of FIG. 3.

The first cell F is under control of first base station 10F and is subdivided in a first cell centre area 12F and a first cell edge area 11F. Similarly, the second cell G is under control of second base station 10G and is subdivided in a second cell centre area 12G and a second cell edge area 11G. Similarly, the third cell J is under control of third base station 10J and is subdivided in a third cell centre area 12J and a third cell edge area 11J. Also, the fourth cell K is under control of fourth base station 100, but it is not subdivided in a cell centre area and a cell edge area. The fourth cell K comprises a fourth cell area which is the whole area of the fourth cell K.

Cells F, G and J are neighbouring cells and their cell edge areas 11F, 11G and 11J are adjacent to each other. The areas where cell edge areas 11F, 11G and 11J are adjacent to each other and/or overlap with each other are referred to as "inter-cell areas". In FIG. 3, the inter-cell area between cells G and J is indicated by a dotted line and a user equipment 20 is positioned in this inter-cell area for communicating with cell G or cell J. Further, FIG. 3 shows a control unit 30 which may wirelessly or by means of wires (not shown in FIG. 3 for the sake of simplicity) communicate with the base stations 10.

The varied load conditions of the cells A to Q reflects a typical network scenario at office hours on a working day, where cells at city centres and adjacent areas are heavily loaded, cells at sub-urban residential areas are medium loaded and cells at rural areas are lightly loaded. FIG. 3 also illustrates the resource allocations in accordance with an embodiment of the present invention:

The first cell F having the highest load value uses a first set of communication resources indicated in a first setup. The first set comprises first cell centre communication resources $f_1, f_2, f_3, f_4$ for the first cell centre area 12F and first cell edge communication resources $f_5, f_6$ for the first cell edge area.

The second cell G having a load value lower than the highest load value uses a second set of communication resources indicated in a second setup. The second set comprises second cell centre communication resources $f_2, f_5, f_6$ for the second cell centre area 12G and second cell edge communication resources $f_3, f_4$ for the second cell edge area 11G. Hence, the second cell centre communication resources $f_2, f_5, f_6$ are less than the first cell centre communication resources $f_2, f_3, f_4$. In other words, the number of the second cell centre communication resources $f_2, f_5, f_6$ (which is 3) is fewer than the number of first cell centre communication resources $f_1, f_2, f_3, f_4$ (which is 4). By using less communication resources in the second cell centre, the area of the second cell centre is decreased for resource $f_1$ and the re-use distance is increased. The transmit power can be reduced accordingly.

Similar considerations apply when configuring a third setup for the third cell J: The third cell J having a load value lower than the load value of the second cell uses a third set of communication resources indicated in third setup. The third set comprises third cell centre communication resources $f_5, f_6$ for the third cell centre area 12J and third cell edge communication resources $f_1, f_1$ for the third cell edge area 11J. Hence, the third cell centre communication resources $f_5, f_6$ are less than the neighbouring cell centre communication resources $f_1, f_2, f_3, f_4$ and $f_2, f_5, f_6$.

Thus, the embodiment of FIG. 3 decreases the number of cell centre resources as the load value is decreasing. For example, cell L having the fourth-highest load value uses only one communication resource in its centre and cell P having the fifths-highest load value uses no communication resource in its centre. That is, cell P does not distinguish between a cell centre area and a cell edge area any more. Cell P uses two communication resources in its whole cell area, which may be understood to be the "cell centre area" within the meaning of the general concept of the resource allocation algorithm of the present invention. Applying the embodiment of the resource allocation to cell K yields decreasing the cell area resources (in the general meaning of the algorithm: "decreasing the cell centre area resources") of cell P, thus arriving at cell K using only one communication resource. As cell K has the lowest load, the use of one communication resource suffices the demand of communication links and the re-use distance is maximised.

In FIG. 3, it is assumed that the inter-cell area of cells G and J may be selected to be improved in terms of the SIR which user equipment 20 experiences when communicating with cell G or J. In a practical system, this may be due to a particular event (like a sports event) taking place. The resource allocation algorithm enhance the inter-cell area SIR by limiting the cell edge resource band $f_1$, being used in neighbour cell F, taking into account that the load conditions allow such limitations.

Figure 4:
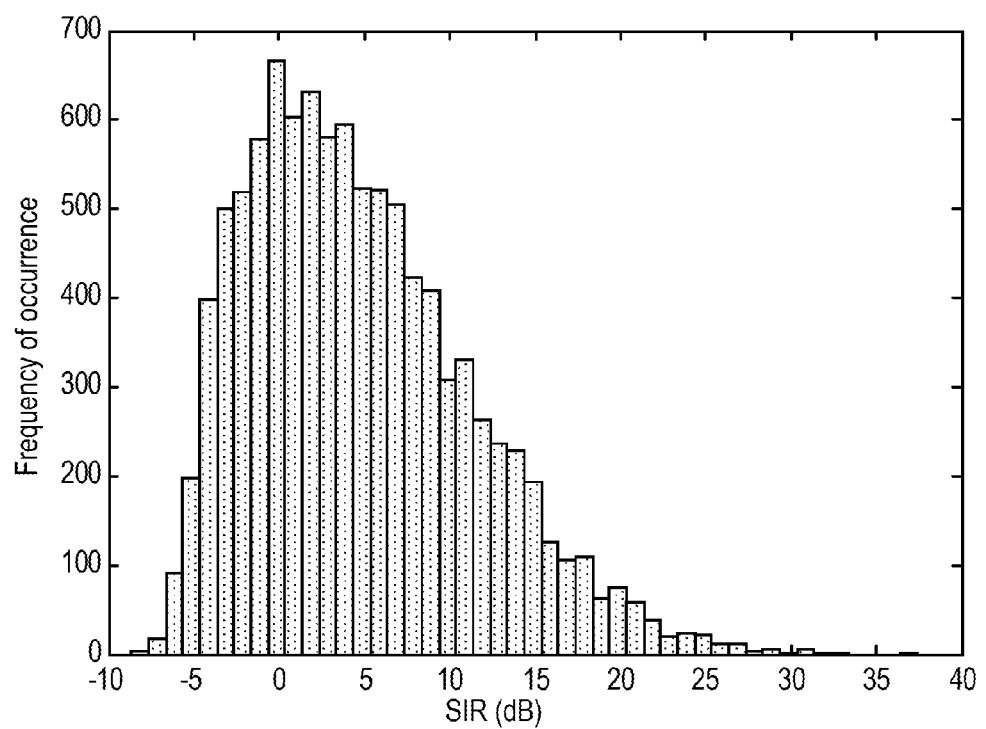
FIG. 4 shows the SIR distribution for a cell edge area of the network of FIG. 3.

FIG. 4 shows a diagram of the SIR as seen by the user equipment 20 at the cell edge (inter-cell area) as illustrated in FIG. 3. The user equipment location is varied randomly along the cell edge. Also, similarly as in FIG. 2, the shadow fading component is varied, according to a log-Normal distribution with 8 dB standard deviation. The user equipment may pick up the best cell (i.e. the best frequency band) as per the best measured RSRQ value as defined in the LTE standard. A vertical antenna pattern with 6° half power beamwidth is employed, which reduces interference spreading to adjacent cells. The simulated SIR for 10,000 iterations is plotted below in FIG. 4.

Figure 2:
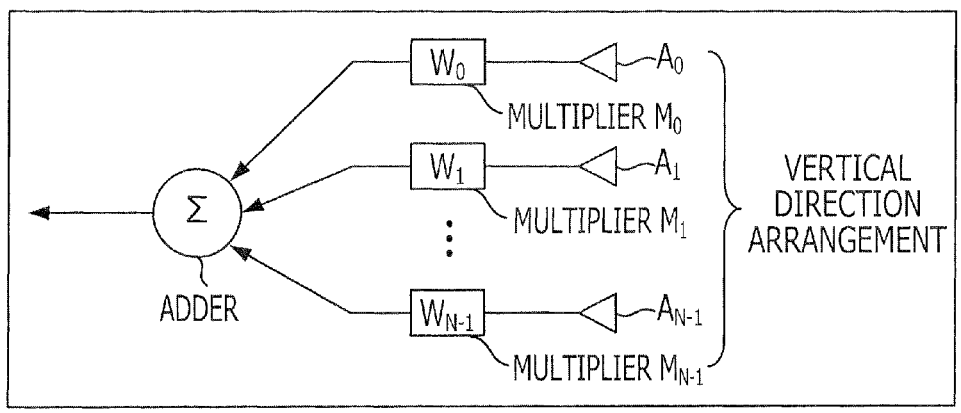
FIG. 2 shows the SIR distribution for a cell edge area of the network of FIG. 1.
Figure 5:
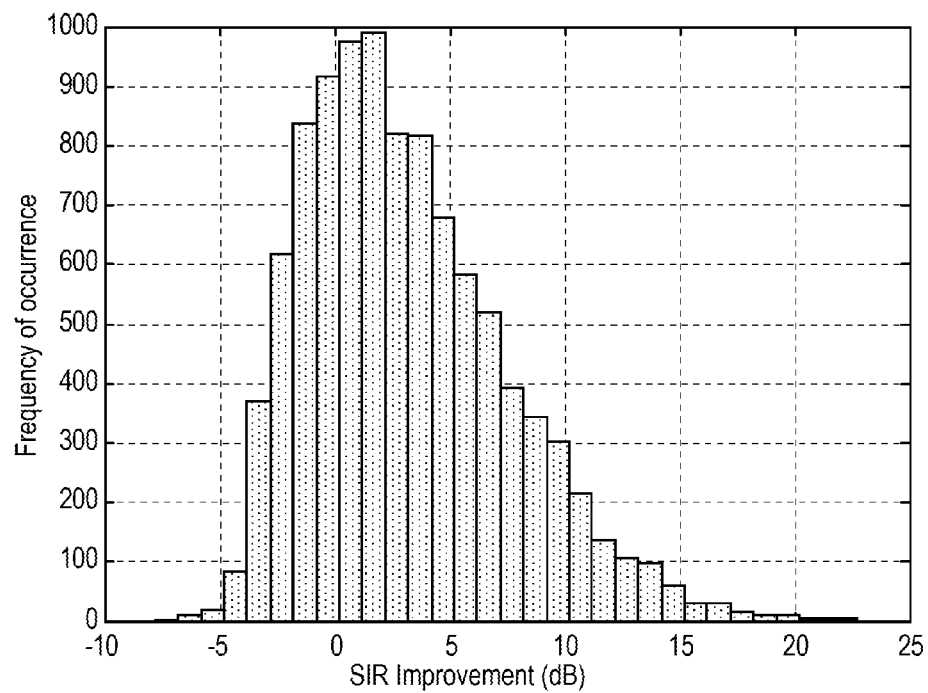
FIG. 5 shows the SIR improvement on the basis of FIGS. 2 and 4.

FIG. 5 allows a comparison of the SIRs as shown in FIGS. 2 and 4 for investigating effectiveness of the resource allocation algorithm of the embodiment of FIG. 3 for improving the cell edge SIR. The SIR of FIG. 5 is calculated by taking the difference between the SIR or FIG. 2 and the SIR of FIG. 4. The distribution of the SIR difference is plotted below for the 10,000 iterations in FIG. 5.

FIG. 5 shows that for over 70% of the iterations, the SIR has improved over the known soft FFR. The mean SIR improvement is approximately 3.1 dB. Hence, a considerable improvement of SIR can be achieved with the embodiment of the proposed resource allocation algorithm for the targeted cell edge, thus offering the user equipment at the cell edge higher data rates and better quality of service.

In a Green wireless application, the embodiment of the resource allocation algorithm enables the cell J to reduce its transmit power. As the cell edge marked by the dotted line is the worst affected cell edge for cell J, the signal power can be reduced by roughly 3 dB, which may yield a reduction of output signal power by 50%. In terms of input power consumption, it may allow the power amplifier at cell J to reduce radio frequency (RF) power consumption by about 42%. This value is calculated considering a typical efficiency curve of a Fujitsu power amplifier (for example, PAE graph for Fujitsu FLL1500UI GaAs FET Push-Pull Power Amplifier). In RF power amplifiers, the efficiency drops as the output power is reduced from a normal operated value. Typically, in a micro base station, the RF power consumption varies from about 20% to 25% of total power consumption (as discussed in Oliver Arnold et. al., "Power consumption modelling of different base station types in Heterogeneous Cellular Networks", Proceedings of Future Networks Mobile Summit 2010, which is hereby incorporated in its entirety by reference). Hence the energy saving for a particular micro base station may vary around 8%-10% in the embodiment.

Figure 6:
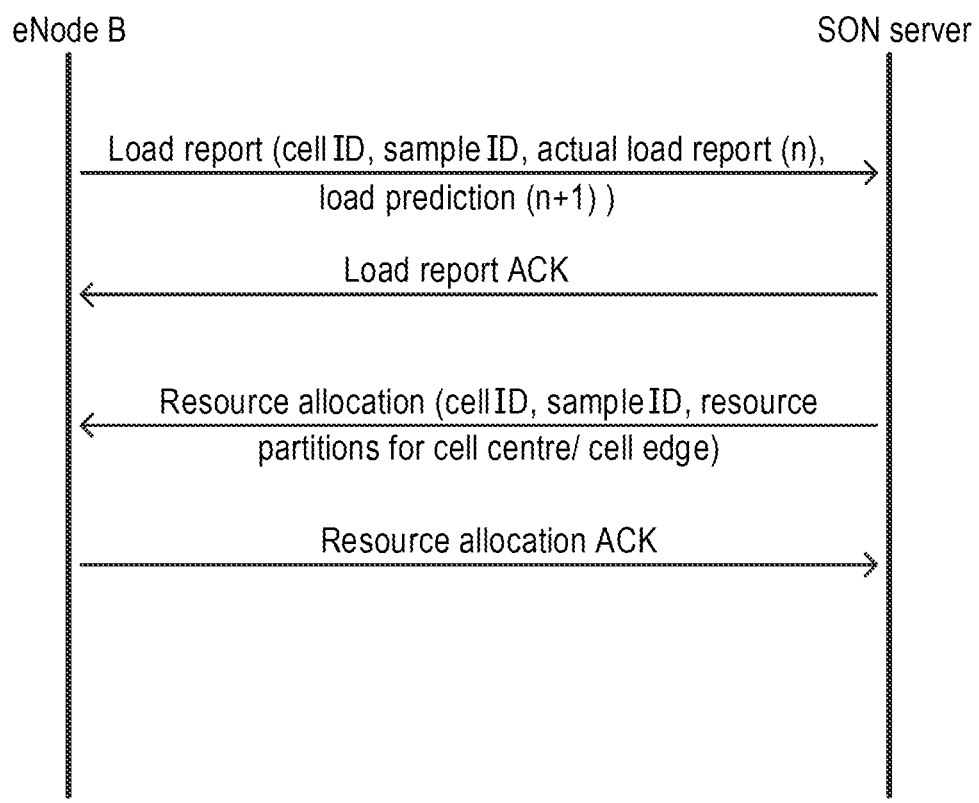
FIG. 6 illustrates an embodiment of a signalling procedure for the resource allocation between an cNodeBs and the SON server.

FIG. 6 illustrates a signalling procedure between eNodeBs 10 and a SON server (comprising control unit 30) in a LTE implemented embodiment. A load prediction may be done on individual eNodeBs 10, based on a prediction algorithm (such as Holt Winter's forecasting method D. Tikunov et. al., "Traffic prediction for mobile network using Holt-Winter's exponential smoothing", IEEE Softcom conference proceedings, 2007, which is hereby incorporated in its entirety by reference) which uses historical load data. These predictions are carried out for each sample interval and reported to the SON server. It is noted that in an alternative embodiment the SON server may predict the load for each cell/sector A to Q, although this may increase the complexity of the SON server.

The SON server then collects the load predictions and determines the communication resources which support the predicted loads. The SON server executes the resource allocation algorithm to determine which resources should be assigned to each of the cells/sectors A to Q. The SON server then instructs each cell/sector A to Q accordingly through signalling back to the individual eNodeBs 10.

The signalling procedure may be carried out at the start of each load sample time interval, for example every 15 to 30 minutes. The load report from an eNodeB 10 may contain a determined actual load status for the previous time interval (n) and a predicted load for the current load sample (n+1). The SON server may use the actual load statistics against the predicted load values to access the accuracy of the load prediction algorithms. This information may help the SON server to determine how much (if any) additional resources (i.e. optional resources) should be allocated above the predicted value as a precautionary measure against erroneous predictions.

In alternative embodiments to the embodiment shown in FIG. 6, traffic loading could be in terms of aggregate data rate and/or time/frequency domain resource usage, and/or the resource allocation message in FIG. 6 could include instructions to disable/enable additional resources, from the current set or setup.

Figure 7:
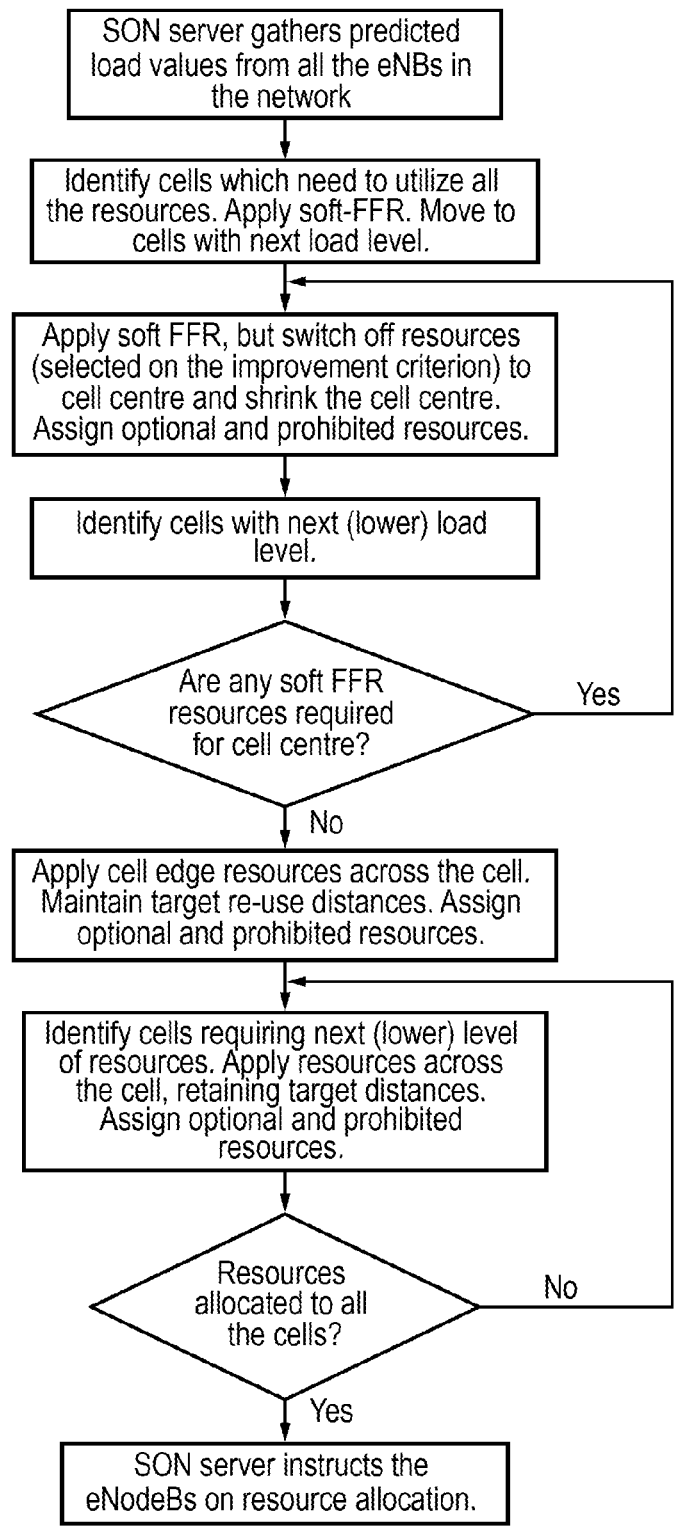
FIG. 7 illustrates a flow-chart of an embodiment of the dynamic resource allocation algorithm according to the present invention.

FIG. 7 is a flow chart describing a basic implementation of an embodiment of the centralised resource allocation algorithm. It is assumed that a SON server requests the load information (predicted for the next time period) from the eNodeBs 10 in the network 1, runs the centralised resource allocation algorithm to assign resources to each eNodeB 10 and informs each eNodeB 10 of its resource allocation.

The load conditions across a network 1 are usually dynamic and thus it may be practical to collect the load information to the SON server every 15-30 minutes and run the centralised resource allocation algorithm. A feature of the centralised resource allocation algorithm is to maintain target resource re-use distances for the cell edge resource allocations. These distances may be maintained generally for the whole network 1 (this option will reduce overall interference and allow reduced transmit power) or for a particular cell (or a group of cells) whose cell edge require a specific level of SIR. The SON server may instruct each cell A to Q with nominal resources, optional resources for cell centres 12 (in case the actual capacity exceeds the expected demand) and prohibited resources (in case a neighbour cell needs to maintain an enhanced SIR). Depending on the scenario and performance requirements the use of any two these types of resources may be sufficient. A preferred basic embodiment of the proposed algorithm is listed in the following:

i. Depending on the load values, first identify cells which need to operate utilizing full amount of resources (load $L_1$); apply a similar pattern as that of the known soft-FFR for these cells; if $L_1$ cells are adjacent, use alternate resources at cell edge; if cells are apart by a target re-use distance, apply the same resource re-use pattern.

ii. Identify the cells with the next (lower) tier of load values ($L_2$); apply a similar pattern as that of the known soft FFR resource pattern to these cells, but switch off some of the cell centre resources; with uniform user density in a cell, taking off some of the cell centre resources will reduce the cell centre area for $L_2$ cells; this may be practically achieved by reducing the transmit power for the resources allocated to the cell centre. The decision to switch off which resources depends on the criterion for SIR improvement and is described in the detail below; apply cell edge resources similarly as in soft-FFR; assign optional and prohibited (where required) resources to $L_2$ cells.

iii. Identify the cells with next (lower) tier of load values ($L_3$); switch off further cell centre allocations and shrink the cell centre area; assign optional and prohibited (if required) resources as described in (ii).

iv. Repeat the steps (ii) and (iii) until cell centre resource allocations are no longer required.

v. When a cell with load $L_n$ requires only the cell edge resources (or, from a general perspective of the resource allocation algorithm, only the cell centre resources), apply the cell edge resources (cell centre resources) throughout the cell, without a distinction between cell edge and cell centre; maintain re-use distances for the identical resources as governed by the allocation criterion; apply optional and prohibited resources (where required).

vi. Repeat step (v) until the cells with lowest load values are reached.

vii. For cells with lowest load $L_{low}$, assign the minimum number of resources, spanning across the whole cell; maintain re-use distances as described before; assign optional and prohibited resources (where required).

The decision to switch off which resources depends on the criterion for SIR improvement. In one embodiment, if an enhanced SIR is defined for a particular cell edge, the resource allocation algorithm may be directed to achieve a target re-use distance for the resources used in that particular cell edge. As cell edge SIRs are worse than cell centre SIRs, improving the cell edge SIR is usually of more importance. The target re-use distance depends on the SIR improvement required. As a rough estimate, pushing back the interfering cells one tier from being neighbours to a cell edge may improve the cell edge SIR by around 9 dB. When switching off resources in adjacent cells, achieving the target re-use distance should be given priority.

In another embodiment, if the objective is to generally improve the cell edge SIR for all the cells in the network (or a region of the network), so that maximum energy saving can be achieved in a Green wireless approach, the resource allocation algorithm may be used as follows. It should increase the resource re-use distances of cells, which offer the maximum energy saving by reduction of output RF power. In a heterogeneous network, different types of cells have different base stations with varying power added efficiency curves and different fractions of RF power consumption over the total power consumption. Hence, the re-use distances where the load conditions do not require the full resource usage should be maximized after analyzing the parameters of different base stations. As described above, the cell edge SIR is of more importance as it determines the transmit power for the base stations.

In another embodiment, the set of actually used communication resources may be determined on the basis of priority information. A setup of this embodiment includes setup information for all communication resources available in the network 1, but also includes priority information which communication resources to be actually used. With reference to FIG. 3, the embodiment of priority assignment may be understood as follows:

Cell C may be allocated communication resources in the following order with increasing load:
Cell edge $f_1$
Cell edge $f_2$
Cell centre $f_3$
Cell centre $f_4$
Cell centre $f_5$
Cell centre $f_6$ The neighbouring cell H may be allocated communication resources in the following order with increasing load:
Cell edge $f_6$
Cell edge $f_5$
Cell centre $f_4$
Cell centre $f_3$
Cell centre $f_2$
Cell centre $f_1$ Hence, cell centre communication resources $f_1$ and $f_2$ are not included in the set of active communication resources due to lower priority assigned to them. In another embodiment the cell centre communication resources $f_1$ and $f_2$ may be optional or prohibited communication resources.

Figure 1:
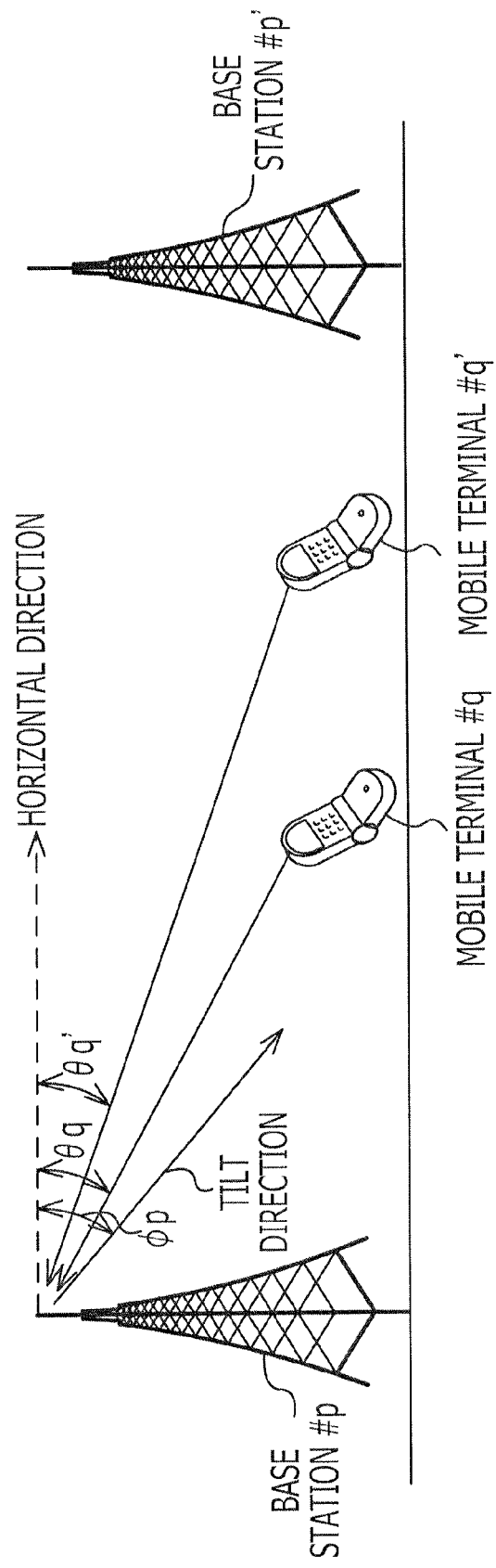
FIG. 1 illustrates known soft-FFR allocations for a varied load network.

For maximum load for cells C and H the configuration may be regarded as equivalent to the known soft FFR as illustrated in FIG. 1. However, for minimum load only $f_1$ would be used in cell C and only $f_6$ would be used in the neighbouring cell H, with a corresponding arrangement in other cells to maximise the frequency reuse distance. The assigned priority order could be pre-defined or configured by a centralised control unit 30. The embodiment of employing priority information may require less signalling on the network side, but may not be as flexible in responding to non-uniform traffic density.

Figure 8:
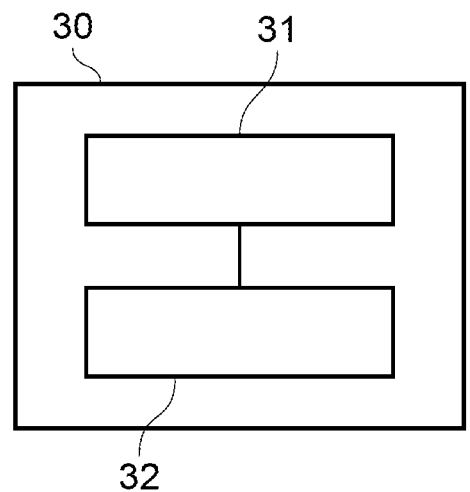
FIG. 8 illustrates an embodiment of a control unit of the present invention.
Figure 9:
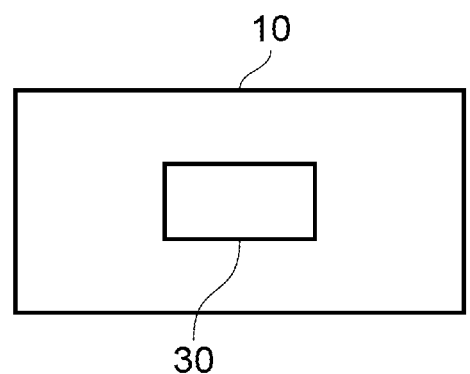
FIG. 9 illustrates an embodiment of a base station of the present invention.

FIG. 8 schematically illustrates an embodiment of a control unit 30 comprising a setup configuring unit 31 and a communication resource controlling unit 32. The control unit 30 may be part of a base station 10 as illustrated in FIG. 9 or may be implemented at a higher layer of the network side. The setup configuring unit 31 as well as the communication resource controlling unit 32 are preferably adapted for communicating with base stations 10 for exchanging information about loads and setups.

Figure 10:
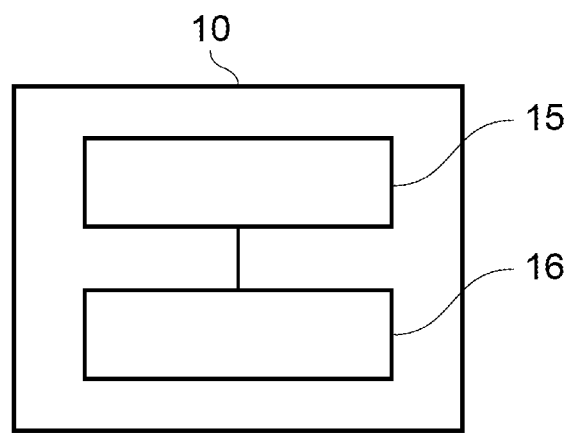
FIG. 10 illustrates another embodiment of a base station of the present invention.

FIG. 10 schematically illustrates an embodiment of a base station 10 comprising a setup receiving unit 15 and a communication resource controlling unit 16. The setup receiving unit 15 is preferably adapted for communicating with a control unit 30 and the communication resource controlling unit 16 is preferably adapted for receiving control information from the setup receiving unit 15 for controlling communication with at least one of cells A to Q.

Figure 11:
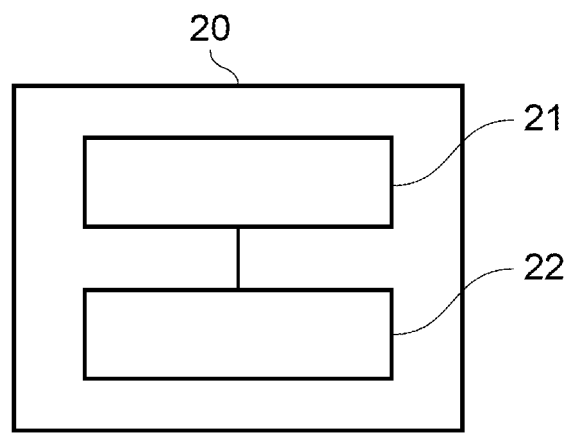
FIG. 11 illustrates an embodiment of a user equipment of the present invention.

FIG. 11 schematically illustrates an embodiment of a user equipment 20 comprising a setup receiving unit 21 and a communication controlling unit 22. The setup receiving unit 21 is preferably adapted for communicating with a control unit 30 and the communication controlling unit 22 is preferably adapted for receiving control information from the setup receiving unit 21 for controlling communication with at least one of cells A to Q.

The invention claimed is:

1. A method for controlling communication resources in a cellular communication network, the cellular communication network comprising a plurality of cells which are under control of at least one base station and which use the communication resources to communicate via communication links, wherein a distance between two neighbouring cells of the plurality of cells using a same communication resource is defined to be a re-use distance of the same communication resource, method comprising:

configuring a first setup of communication resources for a first cell of the plurality of cells, and controlling the first cell to use a first set of communication resources indicated in the first setup by:

controlling the first cell to use a high load set of communication resources of the first set if a first load represented by a high load value is present at the first cell, and controlling the first cell to use a low load set of communication resources of the first set if a second load represented by a low load value is present at the first cell, configuring a second setup of communication resources for a second cell of the plurality of cells in dependence upon one or more of the re-use distance of the at least one communication resource of the low load set and the re-use distance of the at least one communication resource of the high load set, the second setup indicating a second set of communication resources to be used by the second cell, wherein the first load is higher than the second load, wherein the re-use distance of at least one communication resource of the low load set is larger than the re-use distance of the at least one communication resource of the high load set, and wherein a re-use distance of at least one communication resource of the second set is larger than a re-use distance of at least one communication resource of the first set.

2. The method of claim 1, wherein the first cell has a first load value representing loads on the communication links associated with the first cell, the method further comprising:

configuring the second setup of communication resources for the second cell of the plurality of cells, the second cell having a second load value representing loads on the communication links associated with the second cell, wherein the first load value is higher than the second load value, and controlling the second cell to use a second set of communication resources indicated in the second setup, wherein the second set comprises less communication resources than the first set.

3. The method of claim 1, wherein the first set comprises first cell centre communication resources for a first cell centre area of the first cell and first cell edge communication resources for a first cell edge area of the first cell, wherein the first cell edge communication resources differ from the first cell centre communication resources, and wherein the second set comprises second cell centre communication resources for a second cell centre area of the second cell and second cell edge communication resources for a second cell edge area of the second cell, wherein the second cell edge communication resources differ from the second cell centre communication resources, and wherein the second cell centre communication resources are less than the first cell centre communication resources.

4. The method of claim 1, wherein one or more of the steps of configuring the first and second setups includes assigning priority information to the communication resources comprised in one or more of the first and second setups, and wherein the step of controlling the first cell includes controlling the first cell to use the first set of communication resources based on the priority information.

5. The method of claim 1, wherein the method further comprises:

determining load values representing loads on the communication links associated with the plurality of cells, wherein the determined load values comprise high and low load values or high, low, first and second load values, and predicting load values representing loads on communication links associated with the plurality of cells, wherein the predicted load values comprise the high and low load values or the high, low, first and second load values, wherein the method further comprises:

adapting one or more of the first and second sets and the first and second setups based on one or more of the determined and predicted load values.

6. The method of claim 1, wherein the method further comprises:

updating one or more of the first and second cells with one or more of updated first and second setups for enabling and disabling communication resources of one or more of the first and second sets.

7. The method of claim 1, wherein the second setup indicates at least one optional or prohibited communication resource, and wherein the method further comprises:

controlling the second cell to not use the at least one prohibited communication resource, or controlling the second cell to use the at least one optional communication resource if a second load value exceeds a threshold load value.

8. The method of claim 1, wherein the step of configuring the second setup includes:

selecting the communication resources of the second setup based on a second load value and one or more of the first setup and the first set.

9. The method of claim 1, wherein the step of configuring the second setup includes:

selecting second cell centre communication resources by:
pre-selecting first cell edge communication resources, and
de-selecting at least one of the pre-selected communication resources.

10. The method of claim 9, wherein the method further comprises:

determining re-use distances of the pre-selected communication resources, and wherein the step of de-selecting the at least one of the pre-selected communication resources is based on the determined re-use distances of the pre-selected communication resources.

11. The method of claim 1, wherein the method further comprises:

configuring a third setup of communication resources for a third cell of the plurality of cells, the third cell having a third load value representing the loads on the communication links associated with the third cell, wherein a second load value is higher than the third load value, controlling the third cell to use a third set of communication resources indicated in the third setup, wherein the third set comprises third cell centre communication resources for a third cell centre area of the third cell and third cell edge communication resources for a third cell edge area of the third cell, wherein the third cell edge communication resources differ from the third cell centre communication resources, and wherein the third cell centre communication resources are less than second cell centre communication resources, or wherein the third set comprises third cell communication resources for a third cell area of the third cell, and wherein the third cell communication resources are less than the second cell centre communication resources.

12. A control unit for controlling communication resources in a cellular communication network, the cellular communication network comprising a plurality of cells which are under the control of at least one base station and which use the communication resources to communicate via communication links, wherein a distance between two neighbouring cells of the plurality of cells using a same communication resource is defined to be a re-use distance of the same communication resource, the control unit comprising:
  a setup configuring unit for configuring a first setup of communication resources for a first cell of the plurality of cells, and
  a communication resource controlling unit for controlling the first cell to use a first set of communication resources indicated in the first setup, by:
    controlling the first cell to use a high load set of communication resources of the first set if a first load represented by a high load value is present at the first cell, and
    controlling the first cell to use a low load set of communication resources of the first set if a second load represented by a low load value is present at the first cell,
  wherein the first load is higher than the second load,
  wherein the re-use distance of at least one communication resource of the low load set is larger than the re-use distance of the at least one communication resource of the high load set,
  wherein the setup configuring unit further configures a second setup of communication resources for a second cell of the plurality of cells in dependence upon one or more of the re-use distance of the at least one communication resource of the low load set and the re-use distance of the at least one communication resource of the high load set, the second setup indicating a second set of communication resources to be used by the second cell, and
  wherein a re-use distance of at least one communication resource of the second set is larger than a re-use distance of at least one communication resource of the first set.

13. A method for controlling a first cell of a cellular communication network, the cellular communication network comprising a plurality of cells which are under control of at least one base station and which use communication resources to communicate via communication links, wherein a distance between two neighbouring cells of the plurality of cells using a same communication resource is defined to be a re-use distance of the same communication resource, the method comprising:
  receiving first setup information representing a first setup of communication resources for the first cell, and
  controlling the first cell to use a first set of communication resources indicated in the first setup by:
    controlling the first cell to use a high load set of communication resources of the first set if a first load represented by a high load value is present at the first cell, and
    controlling the first cell to use a low load set of communication resources of the first set if a second load represented by a low load value is present at the first cell,
  receiving a second setup of communication resources for a second cell of the plurality of cells in dependence upon one or more of the re-use distance of the at least one communication resource of the low load set and the re-use distance of the at least one communication resource of the high load set, the second setup indicating a second set of communication resources to be used by the second cell,
  wherein the first load is higher than the second load, and
  wherein the re-use distance of at least one communication resource of the low load set is larger than the re-use distance of the at least one communication resource of the high load set, and
  wherein a re-use distance of at least one communication resource of the second set is larger than a re-use distance of at least one communication resource of the first set.

14. A base station for controlling a first cell of a cellular communication network, the cellular communication network comprising a plurality of cells which are under control of at least one base station and which use communication resources to communicate via communication links, wherein a distance between two neighbouring cells of the plurality of cells using a same communication resource is defined to be a re-use distance of the same communication resource, wherein the base station comprises:
  a setup receiving unit for receiving first setup information representing a first setup of communication resources for the first cell, and
  a communication resource controlling unit for controlling the first cell to use a first set of communication resources indicated in the first setup by:
    controlling the first cell to use a high load set of communication resources of the first set if a first load represented by a high load value is present at the first cell, and
    controlling the first cell to use a low load set of communication resources of the first set if a second load represented by a low load value is present at the first cell,
  wherein the first load is higher than the second load, and
  wherein the re-use distance of at least one communication resource of the low load set is larger than the re-use distance of the at least one communication resource of the high load set,
  wherein the setup receiving unit further receives a second setup of communication resources for a second cell of the plurality of cells in dependence upon one or more of the re-use distance of the at least one communication resource of the low load set and the re-use distance of the at least one communication resource of the high load set, the second setup indicating a second set of communication resources to be used by the second cell, and
  wherein a re-use distance of at least one communication resource of the second set is larger than a re-use distance of at least one communication resource of the first set.

15. A method for controlling a user equipment communicating with a first cell of a cellular communication network, the cellular communication network comprising a plurality of cells which are under the control of at least one base station and which use communication resources to communicate via communication links, wherein a distance between two neighbouring cells of the plurality of cells using a same communication resource is defined to be a re-use distance of the same communication resource, the method comprising:
  receiving first setup information representing a first setup of communication resources for the first cell, and
  controlling the user equipment to communicate with the first cell by using a first set of communication resources indicated in the first setup, wherein the first cell is controlled to use a high load set of communication resources of the first set if a first load represented by a high load value is present at the first cell, and wherein the first cell is controlled to use a low load set of communication resources of the first set if a second load represented by a low load value is present at the first cell, the method further comprising a step of receiving a second setup of communication resources for a second cell of the plurality of cells in dependence upon one or more of the re-use distance of the at least one communication resource of the low load set and the re-use distance of the at least one communication resource of the high load set, the second setup indicating a second set of communication resources to be used by the second cell, wherein the first load is higher than the second load, wherein the re-use distance of at least one communication resource of the low load set is larger than the re-use distance of the at least one communication resource of the high load set, and wherein a re-use distance of at least one communication resource of the second set is larger than a re-use distance of at least one communication resource of the first set.

16. A user equipment for communicating with a first cell of a cellular communication network, the cellular communication network comprising a plurality of cells which are under the control of at least one base station and which use the communication resources to communicate via communication links, wherein a distance between two neighbouring cells of the plurality of cells using a same communication resource is defined to be a re-use distance of the same communication resource, the user equipment comprising:

a setup receiving unit for receiving first setup information representing a first setup of communication resources for the first cell, and a communication controlling unit for controlling the user equipment to communicate with the first cell by using a first set of communication resources indicated in the first setup, wherein the first cell is controlled to use a high load set of communication resources of the first set if a first load represented by a high load value is present at the first cell, and wherein the first cell is controlled to use a low load set of communication resources of the first set if a second load represented by a low load value is present at the first cell, wherein the first load is higher than the second load, and wherein the re-use distance of at least one communication resource of the low load set is larger than the re-use distance of the at least one communication resource of the high load set, wherein the setup receiving unit further receives a second setup of communication resources for a second cell of the plurality of cells in dependence upon one or more of the re-use distance of the at least one communication resource of the low load set and the re-use distance of the at least one communication resource of the high load set, the second setup indicating a second set of communication resources to be used by the second cell, and wherein a re-use distance of at least one communication resource of the second set is larger than a re-use distance of at least one communication resource of the first set.

* * * * *